United States Patent

[11] 3,567,922

| [72] | Inventor | Gerald E. Blair<br>Santa Barbara, Calif. |
|---|---|---|
| [21] | Appl. No. | 746,727 |
| [22] | Filed | July 1, 1968 |
| [45] | Patented | Mar. 2, 1971 |
| [73] | Assignee | EG & G. Inc.<br>Continuation of Ser. No. 432,804,<br>Feb. 15, 1965 |

[54] THERMOLUMINESCENT DOSIMETER AND METHOD
5 Claims, 7 Drawing Figs.

[52] U.S. Cl. ............................................. 250/71,
161/42, 252/301.4, 264/21, 264/332
[51] Int. Cl. ............................................. C09k 1/06,
G01n 21/38
[50] Field of Search ........................................ 264/21, 82,
332; 250/71; 161/42; 252/301.4, 301.4 (S);
106/39

[56] References Cited
UNITED STATES PATENTS
| 3,141,973 | 7/1964 | Heins et al. ................ | 252/301.4 |
| 3,282,855 | 11/1966 | Palmer et al. ................ | 252/301.4 |
| 3,312,759 | 4/1967 | Letter ................ | 264/332 |

Primary Examiner—Robert F. White
Assistant Examiner—Jeffery R. Thurlow
Attorneys—Ralph L. Cadwallader and Leo M. Kelly ABSTRACT: Thermoluminescent dosimeter and method of making the same including compressing thermoluminescent material under high pressure and at an elevated temperature while flushing the same with a dry inert gas thus forming the thermoluminescent material into a solid that may be sliced into dosimeter wafers. The process also activates coprecipitated calcium fluoride and manganous fluoride.

GERALD E. BLAIR
*INVENTOR.*

BY Cadwallader, Kelly & Dacey

ATTORNEYS

GERALD E. BLAIR
INVENTOR.

PATENTED MAR 2 1971    3,567,922

GERALD E. BLAIR
INVENTOR.

BY Cadwallader, Kelly & Dacey

ATTORNEYS

THERMOLUMINESCENT DOSIMETER AND METHOD

This application is a streamline continuation of Ser. No. 432,804, filed 2/15/65, now abandoned.

The present invention relates to apparatus for measuring ionizing radiation, and more particularly, to an improved thermoluminescent dosimeter and to an improved method of manufacturing the same.

Exposure to ionizing radiation, such as X-rays, gamma rays, cosmic rays, and nuclear radiation generally, constitutes a serious hazard to human beings. Moreover, activities involving exposure to ionizing radiation are increasing. Thus medical and dental practitioners expose their patients and themselves to X-ray and gamma ray radiation while performing a variety of diagnostic and therapeutic procedures. Nuclear fission atomic power plants, both stationary and mobile, produce biologically harmful radiations during operation. Moreover, their by-products are intensely radioactive materials which must be handled, processed, stored and transported. Concentrated radioactive isotopes find increasing uses in industry and in research laboratories. Military nuclear weapons, upon detonation, disperse immense quantities of radioactive material into the atmosphere which may fall on populated centers. In space exploration, manned vehicles pass through regions of intense ionizing radiation which expose the vehicles and their occupants to cosmic radiation generally. Thus many people are being exposed to biologically harmful radiation. To avoid excessive dosage, such persons must monitor the total radiation which their bodies receive. In addition, there are numerous other requirements in industry and in research laboratories for monitoring radiation with high reliability. To do this, a variety of instruments, such as ionization chambers, Geiger counters, scintillation detectors, and others, are used. These require power to operate, and have other disadvantages insofar as personnel radiation monitoring is concerned. Heretofore, passive or nonpowered dosimeters, which integrate or sum the total incident radiation, have proven most useful for personnel monitoring. Most widely used are the small pocket-sized electroscope and the photographic film badge.

The photographic film badge dosimeter requires considerable processing after exposure to develop the film and to translate the developed film into units of radiation dosage. Then it is reloaded with fresh unexposed film before it is used again. Photographic film badge dosimeters are reliable through the dosage range in which they are sensitive; however, they lack as wide a dosage range as is desirable. Also, they lack close tolerance and quantitive reproducibility. Further, processing for readout is too complicated to be practical in field or disaster environments. Thus, there are many good reasons for replacing the photographic film badge dosimeter.

Another pocket-sized, easily read dosimeter utilizes the electroscope. These are easy to charge and to calibrate under field conditions and are conveniently read visually. However, they are highly sensitive to mechanical shock and rough handling, both of which cause loss of calibration. Therefore, their reliability is always questionable. They do have the advantage of not requiring complex processes for readout and reloading prior to reuse, but may be read out visually and recalibrated by very simple means.

Thus, the need exists for a highly reliable radiation dosimeter which may be used over and over again without additional reloading, complex processing, or calibration. Such a dosimeter must have a very high reliability and good accuracy under the most severe of field conditions or disaster environments. This need has led to serious and expensive efforts to adapt the phenomenon of thermoluminescence to personnel radiation dosimetry, which, to date, has not met too much practical success.

Thermoluminescence is a phenomenon observed in a number of materials, some of which occur naturally, in which electrons are sufficiently excited by impinging ionizing radiation to undergo transitions to certain metastable states or traps. From there they may be excited by heat energy to undergo further transitions to emitting states from which they experience optical transitions back to the ground state, emitting visible light during these latter transitions.

Thermoluminescent materials can now be prepared which exhibit good reproducibility in their response to radiation dosage. Further, they may be exposed repeatedly, even hundreds of times, to radiation, each radiation exposure being quantitatively impressed upon the material and they may be quantitatively read out upon heating between each exposure. Despite extensive reuse, the response of such samples of thermoluminescent materials to ionizing radiation remains unchanged.

To determine the amount of exposure, the thermoluminescent material is heated up to about 300° C during which it luminesces. The recording of luminescent brightness versus temperature taken at a constant heating rate is called the "glow curve." The number of different types of traps in the material and the energy by which the electrons are bound in these traps determine the number of peaks in the "glow curve" and the temperatures at such peaks. With shallow traps (less binding energy) moderate ambient temperatures release the trapped electrons and visible photons. The deeper the trap, the higher the glow peak temperature, and the more stable is the thermoluminescent signal of the phosphor at ambient temperatures. The thermoluminescent brightness for a given exposure depends on the concentration of trapping sites (quantum efficiency) and on the efficiency of the transitions back to the ground state. The rate of heating the phosphor also affects the glow curve, although the total light emitted in the same regardless of heating rate. Faster heating gives narrower glow curves of higher peak brightness and shifts the peak emission to higher temperatures.

When used as a dosimeter, light sensitive apparatus detects the luminescent output of the thermoluminescent material during the heating process, converts it to an electrical signal and recording apparatus records the entire glow curve, including the peaks. Either the area under the glow curve or a portion thereof, or the brightness of emitted light at the maximum glow peak constitutes a measure of ionizing radiation dosage. The application of heat during the readout process restores the thermoluminescent material to its original unirradiated condition releasing all the trapped electrons. Upon cooling it is again in condition to register new ionizing radiation exposures. Thermoluminescent materials adaptable to dosimetry must have deep electron traps from which electrons and visible photons are not emitted at normal ambient temperatures. Any material having an appreciable number of shallow and intermediate depth traps which are depopulated at ambient and moderately elevated temperatures with the passage of time, is unsuitable for thermoluminescent dosimetry.

Earlier endeavors to construct practical personnel radiation dosimeters with thermoluminescent phosphor materials were not successful because they were insensitive to low dosage rates, or were unstable and released trapped electrons spontaneously at ambient temperatures with the passage of time. Continued efforts to develop thermoluminescent materials suitable for dosimetry resulted in the production of manganese-activated calcium fluoride, which contains deep traps almost exclusively. One serious disadvantage of the manganese-activated calcium fluoride is its undesirable chemical activity during processing. Other deep-trap thermoluminescent materials occur in nature in limited quantities and can be manufactured. These include lithium fluoride, calcium sulfate and some organic materials.

Various schemes have been devised and proposed for the use of thermoluminescent materials in practical dosimeters. One device utilized only the glow peaks or "thresholds" of various thermoluminescent materials confined within a glass container. No effort was made to read the total radiation quantitatively, but the radiation dosage was estimated to be between that minimum dosage that would produce luminescence in the highest "threshold" material that luminesced and below that of the next higher threshold material that did not luminesce. Obviously this device is not a practical dosimeter because it cannot accurately measure radiation dosage.

A later endeavor included dosimeters prepared by mixing thermoluminescent powder with temperature resistant transparent cementing materials and then coating the mixture onto heating elements encased within a glass tube. Dosimeters constructed in this manner give reliable readings for dosages as low as 50 mr. with little or no spurious luminescent effects. One difficulty encountered with this latter technique of mounting the phosphor is that repeated heating to temperatures in excess of 300° C during readouts causes scaling and breaking up of the thermoluminescent coatings.

Another scheme contemplates compressing thermoluminescent phosphor powder, consisting of a mixture of relatively large and small granular sizes, within a container having a transparent wall. Only sufficient compression is utilized to avoid relative motion of the powder granules with respect to each other and with respect to the container walls. This is done to avoid spurious thermoluminescence of various kinds.

However, these schemes do not provide an inexpensive, practical, sensitive, mechanically rugged dosimeter.

Deep-trap thermoluminescent materials, sensitive to radiation in the milliroentgen range, may be prepared in the laboratory. These materials have a further advantage of being linear in their response to radiation through as much as seven decades of radiation dosage. The desirability of adapting thermoluminescent materials to personnel radiation dosimeters is clear. There remains the practical problem of providing a thermoluminescent dosimeter which is sensitive to very small radiation dosage, which may be used over and over after repeated readout, and which will be inexpensive to manufacture.

The present invention contemplates the use of hot-pressing techniques to make a thermoluminescent dosimeter.

Accordingly, one object of this invention is to provide an improved thermoluminescent radiation dosimeter.

Another object of this invention is to provide an inexpensive, sensitive, and reliable thermoluminescent dosimeter which may be accurately reproduced in great quantity.

Other objects and various further features of novelty and invention will be pointed out or will occur to those skilled in the art from a reading of the following specification and claims.

The invention is more easily described by referring to the following illustrations in which.

In U.S. Pat. No. 3,282,855 issued Nov. 1, 1966 to R. C. Palmer et al. for "Method of Making Thermoluminescent Manganese-Activated Calcium Fluoride" and assigned to the assignee of the present invention, the patentees disclose a method of making manganese-activated calcium fluoride. The method comprises mixing an aqueous slurry of calcium carbonate and 1 to 10 to mole percent of manganous carbonate with a concentrated solution of hydrofluoric acid. The reaction is quite vigorous and after 2 or 3 minutes a coprecipitate of calcium fluoride and manganous fluoride forms. When the coprecipitate ceases forming, it is washed 3 or 4 times with either de-ionized or distilled water to remove all hydrofluoric acid, and other by-products of the reaction. It is then dried at about 95° C, producing a powdered mixture of calcium fluoride and manganous fluoride. At this stage the coprecipitate is not useful as a thermoluminescent material because it is only slightly thermoluminescent. The powdered coprecipitate is then placed in a platinum crucible and heated in a dry inert atmosphere for 30 minutes at a temperature of about 1200° C. During this heating the coprecipitate becomes a cake of manganese-activated calcium fluoride which is highly thermoluminescent. After cooling the cake may be broken up and pulverized into a powder for use in manufacturing thermoluminescent dosimeters. The latter step of heating at 1200° C is called "activating" because it is believed that such heating forces many more manganese ions into the crystal lattice of the calcium fluoride creating many more deep traps thereby making the material highly thermoluminescent.

Figure 1:
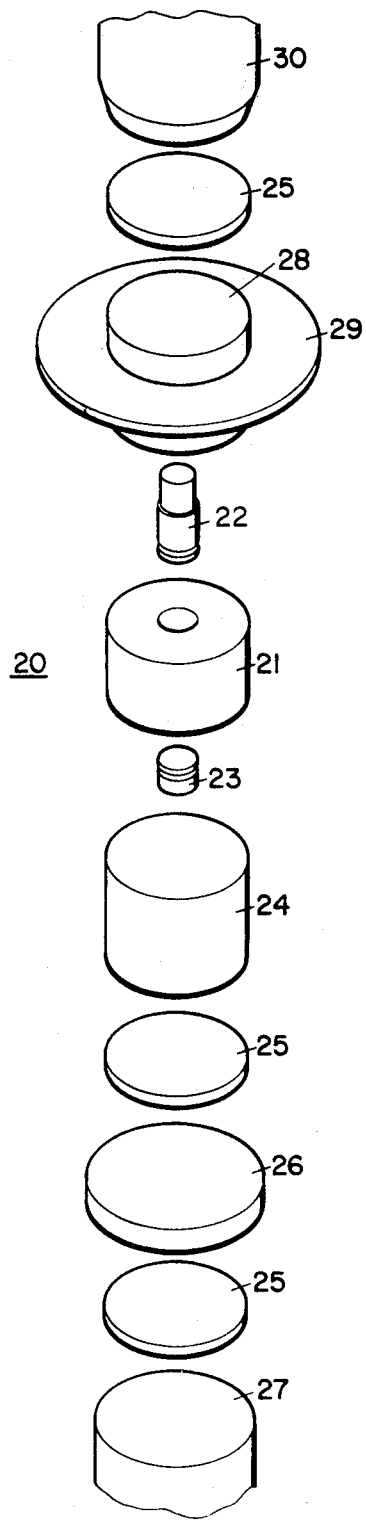
FIG. 1 is an exploded view of some of the component parts of hot pressing apparatus used for making compressed samples from which thermoluminescent dosimeters are obtained.
Figure 2:
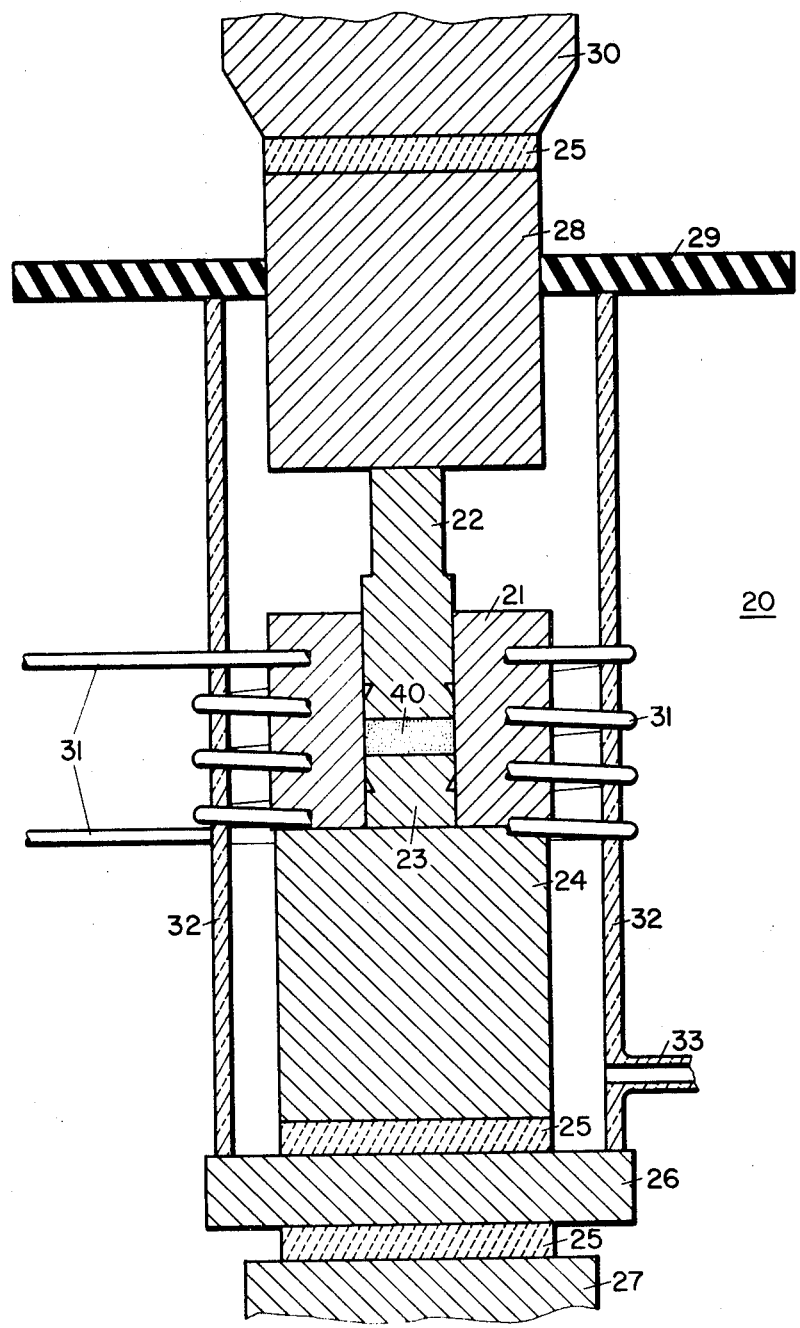
FIG. 2 is a partial sectional view of part of the hot-pressing apparatus.

I have discovered that the 1200° C heating step and the additional dosimeter manufacturing steps of coating some substrate with manganese-activated calcium fluoride may be combined. Specifically, I have discovered that hot pressing techniques may be utilized to concurrently activate and form the coprecipitated calcium fluoride and mangonous fluoride. Referring now to FIGS. 1 and 2, reference number 20 designates a portion of the hot press apparatus utilized. Bottom piston 23 is inserted in cylindrical mold 21 as illustrated and the desired quantity of coprecipitated calcium fluoride and mangonous fluoride is poured into the cavity formed by cylindrical mold 21 and bottom piston 23. Top piston 22 is then inserted into cylindrical mold 21 as illustrated. For this application cylindrical mold 21, top piston 22 and bottom piston 23 are made of Rene 41 which is a high strength nickel alloy made by General Electric Company. Its chemical composition is:

| Elements | Percent Weight |
|---|---|
| Carbon | 0.09 |
| Chromium | 19.0 |
| Cobalt | 11.0 |
| Molybdenum | 10 |
| Titanium | 3.1 |
| Aluminum | 1.5 |
| Nickel | 55.31 |

The surfaces in contact with the coprecipitate are first polished with fine grit silicon carbide cloth and then rinsed with methylethyl ketone to thoroughly clean them. As as example, to make a thermoluminescent sample approximately five-eights inch in diameter and ⅛-inch thick, I have used 2 grams of coprecipitated calcium fluoride and mangonous fluoride. The assembly of the coprecipitated powder 40, top piston 22, bottom piston 23 and cylindrical mold 21 is placed on top of anvil extension 24. A disc shaped alumina ($Al_2O_3$) heat insulator 25 is placed between anvil extension 24 and brass radio frequency shield 26. Another heat insulator 25 is placed between shield 26 and main anvil 27, all as illustrated in FIG. 2.

Fused silica cylinder 32, having a gas supply input port 33, is placed on top of shield 26 in the manner illustrated in FIG. 2. High frequency induction heating coil 31 is placed around glass cylinder 32 in such position that heat will be induced in coprecipitated powder 40, bottom piston 23, top piston 22, and cylindrical mold 21. Its location with respect thereto is illustrated in FIG. 2. A silicone rubber gasket 29 is fitted around ram extension 28 which is placed on top of and axially aligned with top piston 22. Another heat insulator 25 is placed between main ram 30 and ram extension 28. The remainder of the press is not shown because this would serve to confuse and does not contribute to the invention. Anvil extension 24 and ram extension 28 are made of Inconel-X which is a high strength nickel alloy made by International Nickel Company. Its chemical composition is:

| Elements | Percent Weight |
|---|---|
| Carbon | 0.04 |

Chromium 15.0
Cobalt 1.0
Titanium 2.5
Aluminum 0.7
Nickel 73.0
Iron 7.0
Manganese 0.7
Silicon 0.4

Note that all mechanical elements must be accurately aligned axially; otherwise when pressure is applied along the axis the stack of metalic parts may collapse and some may be damaged.

Figure 3:
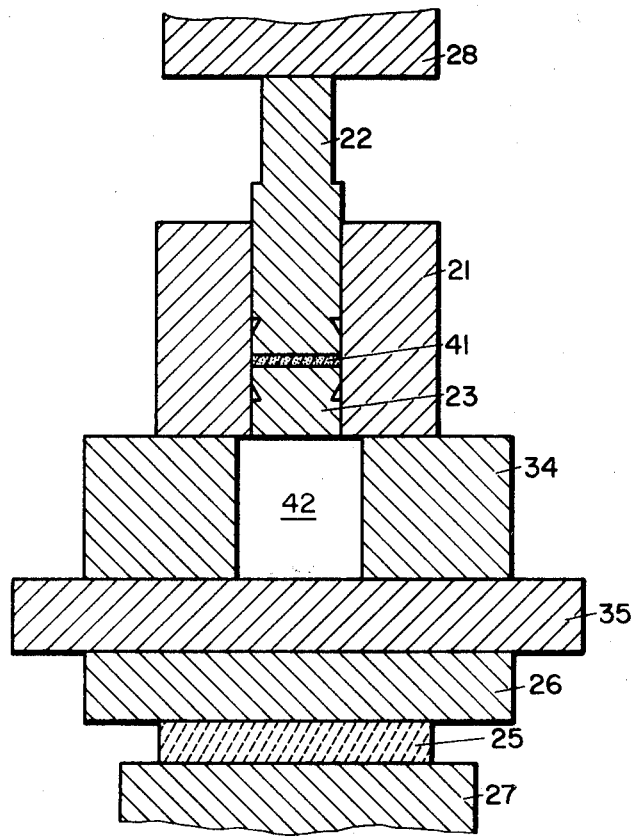
FIG. 3 is a partial sectional view of part of the apparatus illustrated in FIG. 2, modified for removal of the compressed sample.

Hose connections are made between input port 33 and a supply of a dry, inert gas. I have used helium. The flow of gas within cylinder 32 is maintained at about 2 cubic feet per hour. Its function is to replace the air within the assembly and to flush out any oxygen or other gases that may be absorbed or occluded therein. The gas escapes from the assembly at the seal between gasket 29 and ram extension 28 and between fused silica cylinder 32 and shield 26. After flushing for about 10 minutes heat is applied to thermoluminescent powder 40, bottom piston 23, top piston 22, and cylindrical mold 21 by way of high frequency induction heating coil 31. The temperature is raised to and held at about 300° C for about 5 minutes. This permits the gas to further remove oxygen and other gaseous impurities from the assembly. Obviously, other heating means than induction heating may be used. The temperature is then raised until cylindrical mold 21 reaches a red heat at which time the temperature is adjusted to maintain a constant temperature between 700° C and 900° C for about 15 minutes. Radio frequency shield 26 prevents loss of RF energy to the press. During this period a pressure between 30,000 and 125,000 pounds per square inch may be applied for 5 minutes, compressing coprecipitated powder 40 to a thickness of about one-eighth inch. After the pressure is released and the heat terminates, the thermoluminescent sample 41 may be removed from the mold by using thick walled ring 34 and plate 35, both made of high strength steel — (see FIG. 3).

To accomplish this, ram extension 28 and gasket 29 are first removed. Heating coil 31 and glass cylinder 32 are then removed. The assembly of cylindrical mold 21, top piston 22, thermoluminescent sample 41, and bottom piston 23 is raised and thick walled ring 34 and plate 35 (both of which have been heated to about 800° C to avoid thermal shock to thermoluminescent sample 41) are placed axially between said assembly and shield 26. Ram extension 28 and ram 30 are again axially aligned with top piston 22 and pressure is applied until bottom piston 23 and thermoluminescent sample 41 fall into cylindrical hole 42 within thick walled ring 34. The assembly is then allowed to cool in air to room temperature and thermoluminescent sample 41 is removed.

Figure 5:
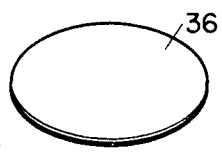
FIG. 5 is a perspective view of the completed thermoluminescent dosimeter.
Figure 4:
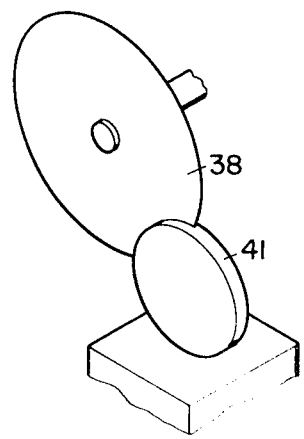
FIG. 4 illustrates the use of a diamond-tipped saw to slice a thermoluminescent dosimeter from the completed compressed sample.

Thermoluminescent sample 41, in the example used above, will be about five-eighths inch thick and about five-eighths inch in diameter. It may be translucent to clear; that is, it may diffuse light passing through it or it may pass light without scattering. Thermoluminescent dosimeters may be made, for example, by slicing thermoluminescent sample 41 with a diamond-tipped saw. This is illustrated partially and schematically in FIG. 4 where diamond-tipped saw wheel 38 is shown cutting a slice from thermoluminescent sample 41. The final product, thermoluminescent dosimeter 36, is illustrated in FIG. 5. Its thickness may range from 30 to 50 thousandths of an inch and it may be almost clear. It may then be mounted in a dosimeter holder not shown. Tests have indicated that the sensitivity of manganese-activated calcium fluoride dosimeters, prepared according to the foregoing process, have twice the sensitivity of the standard sample maintained and utilized by the United States Naval Research Laboratory.

Figure 6:
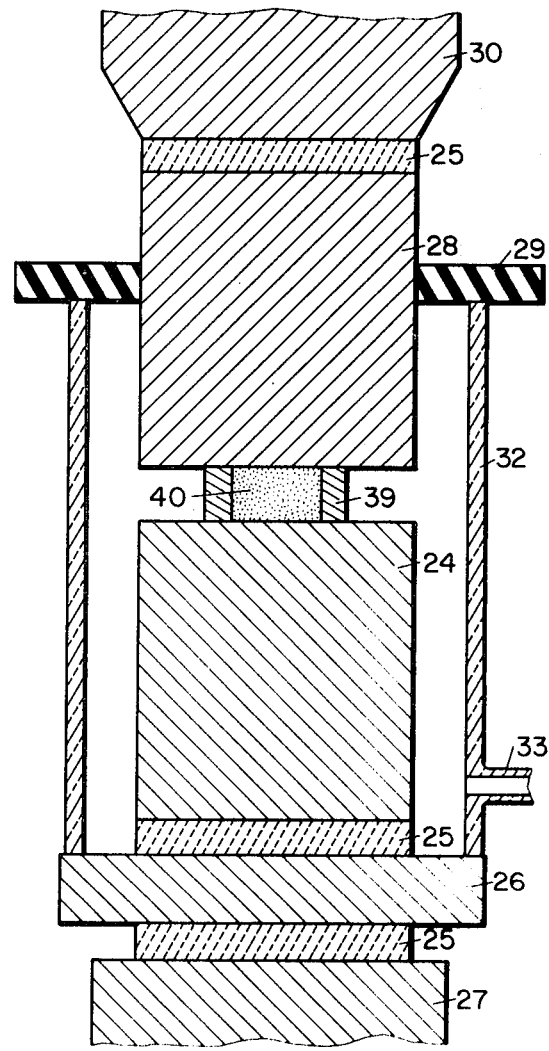
FIG. 6 is a partial sectional view of part of the hot-pressing apparatus illustrating its use in making an alternative thermoluminescent dosimeter.

An alternative thermoluminescent dosimeter 37 (see FIG. 7) may be prepared utilizing the foregoing process. Referring to FIG. 6, a steel ring 39, is placed on top of anvil extension 24 as illustrated. Ram extension 28 and the press are then used to pack thermoluminescent powder 40' at a pressure of about 10,000 pounds per square inch within ring 39 at room temperature. Other methods of cold compacting may be used. The flushing, preheating, heating, and compressing steps describe above follow. After cooling the compressed-steel thermoluminescent sample may be sliced into thermoluminescent dosimeters utilizing the diamond-tipped saw as described above. In this case thermoluminescent dosimeter 37 comprises compressed steel ring 39' which contains compressed thermoluminescent powder 41''. This embodiment also may be mounted within a holder not shown.

Lithium fluoride samples have also been made using the process hereinabove described, but with a hot pressing temperature of about 400°C. However, where activated lithium fluoride powder is used, the hot pressing technique only forms the thermoluminescent sample. Likewise, with manganese-activated calcium fluoride, prepared as described in U.S. Pat. No. 3,282,855 or by any prior art method, the hot pressing technique merely forms the thermoluminescent sample. Experiments to date indicate that the sensitivity of such dosimeters is not as high as that of dosimeters prepared with coprecipitated calcium fluoride and manganous fluoride.

In the example described above, I used 2 grams of coprecipitated calcium fluoride and manganous fluoride to produce thermoluminescent sample 41 which has a diameter of five-eighths inch and was one-eighth inch thick. The density was 3.18 gms/cm$^3$. Larger samples can be made using larger molds and pistons of varying shapes. As a "rule of thumb" the length-to-diameter, or length-to-minimum-cross-sectional dimension, ratio should not exceed 1 to 3. In this example I used 775°C and 42,000 p.s.i. during hot pressing. Using this criteria, it will be relatively easy for one to determine the initial amount of coprecipitated calcium fluoride and manganous fluoride required for a particular sample shape and size. The same criteria apply to manganese-activated calcium fluoride. However, experimental evidence is not yet available on the optimum criteria for lithium fluoride powder and for other thermoluminescent materials.

Figure 7:
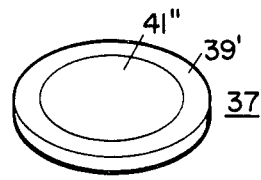
FIG. 7 is a perspective view of the alternative thermoluminescent dosimeter.

One way to read out irradiated dosimeters of the type illustrated in FIGS. 5 and 7 is to place them on a hot plate and raise their temperature at a uniform rate to about 350°C, while recording the glow curve through an infrared masked photomultiplier tuber.

The foregoing specification and drawings are merely illustrative of preferred embodiments of the invention, the scope of which is described in the appended claims.

I claim:

1. The method of making thermoluminescent dosimeters that comprises cold pressing a quantity of thermoluminescent material comprising coprecipitated calcium fluoride and manganese fluoride, within a steel ring to a pressure of approximately 10,000 pounds per square inch, flushing said steel ring and thermoluminescent material initially with a dry inert gas for a period of about 10 minutes to remove absorbed gases and other impurities, preheating said steel ring and thermoluminescent material to a temperature of about 300° C. while continuing said flushing to remove more of said gases, hot pressing said steel ring and thermoluminescent material at an elevated temperature of between about 700° C. and 900° C. and at a pressure ranging from 30,000 to 125,000 pounds per square inch while continuing said flushing, the elevated temperature being maintained for about 15 minutes, discontinuing said flushing while permitting said compressed steel ring and thermoluminescent material to cool to room temperature, and slicing said compressed steel ring and thermoluminescent material into a plurality of thermoluminescent dosimeters each having a thickness ranging from 30 to 50 thousandths of an inch.

2. A thermoluminescent dosimeter formed according to the procedure of claim 1.

3. The method of making thermoluminescent material comprising the steps of:
   flushing a quantity of material consisting of coprecipitated calcium fluoride and manganous fluoride initially with a dry inert gas for a period of about 10 minutes to remove absorbed gases and other impurities;

preheating the coprecipitated material to a temperature of about 300°C while continuing flushing to remove more of the gases;

hot pressing the coprecipitated material at an elevated temperature of between about 700°C and 900°C for about 15 minutes and at a pressure ranging between about 30,000 and 125,000 pounds per square inch while continuing the flushing, the pressure being maintained for about 5 minutes; and discontinuing the flushing while permitting the resulting thermoluminescent material to cool to room temperature.

4. The method of claim 5 including the additional step of slicing the resulting thermoluminescent material into a plurality of thermoluminescent dosimeters each having a thickness ranging from 30 to 50 thousands of an inch.

5. A thermoluminescent dosimeter formed according to the method of claim 4.